United States Patent [19]

Farris et al.

[11] Patent Number: 5,102,090

[45] Date of Patent: Apr. 7, 1992

[54] POWER WINDOW MOTOR MOUNTING BRACKET

[75] Inventors: Timothy M. Farris, Sterling Heights; Richard Pelachyk, Utica; Dante C. Zuccaro, Allenton, all of Mich.

[73] Assignee: General Motors Corporation, Detroit, Mich.

[21] Appl. No.: 694,598

[22] Filed: May 2, 1991

[51] Int. Cl.⁵ .............................................. F16M 1/00
[52] U.S. Cl. ...................................... 248/674; 49/349; 310/91
[58] Field of Search ................ 248/646, 672, 673, 680, 248/674; 49/349; 296/146; 310/42, 47, 91, 89, 90

[56] References Cited

U.S. PATENT DOCUMENTS

| | | | |
|---|---|---|---|
| 4,455,011 | 1/1984 | Levine | 248/646 |
| 4,471,251 | 9/1984 | Yamashita | 296/146 X |
| 4,514,105 | 3/1985 | Adams | 248/637 X |
| 4,517,880 | 5/1985 | Buckner | 248/674 |
| 4,531,700 | 7/1985 | Robinson | 248/672 |
| 4,625,134 | 11/1986 | Weaver | 310/91 X |
| 4,700,095 | 10/1987 | Kawakami | 310/89 X |
| 4,986,029 | 1/1991 | Richter | 49/349 |

*Primary Examiner*—J. Franklin Foss
*Attorney, Agent, or Firm*—Raymond I. Bruttomesso, Jr.

[57] ABSTRACT

A mounting bracket for mounting a window regulator motor housing with three holes to a door panel having three holes aligned with the holes in the power regulator motor and three slots. The mounting bracket has three legs projecting radially outward from a central portion. Each leg has an arm that depends toward the door panel carrying a tab with a ramp surface for engaging the door panel for flexing the tab as tab is inserted in a normal direction to the panel through the slot of the door panel. Each tab has a shoulder for engaging the door panel upon the tab flexing back after insertion of the tab into the slot so that the bracket is secured to the door panel. The central portion engages the motor housing for sandwiching the motor housing between the mounting bracket and the door panel so that the motor housing is mounted to the door panel. Three locator pins depending through the holes in the motor housing and the aligned holes in the door panel prevent rotation of the motor housing in relation to the door panel. The legs of the mounting bracket are equally spaced radially about the central portion.

4 Claims, 2 Drawing Sheets

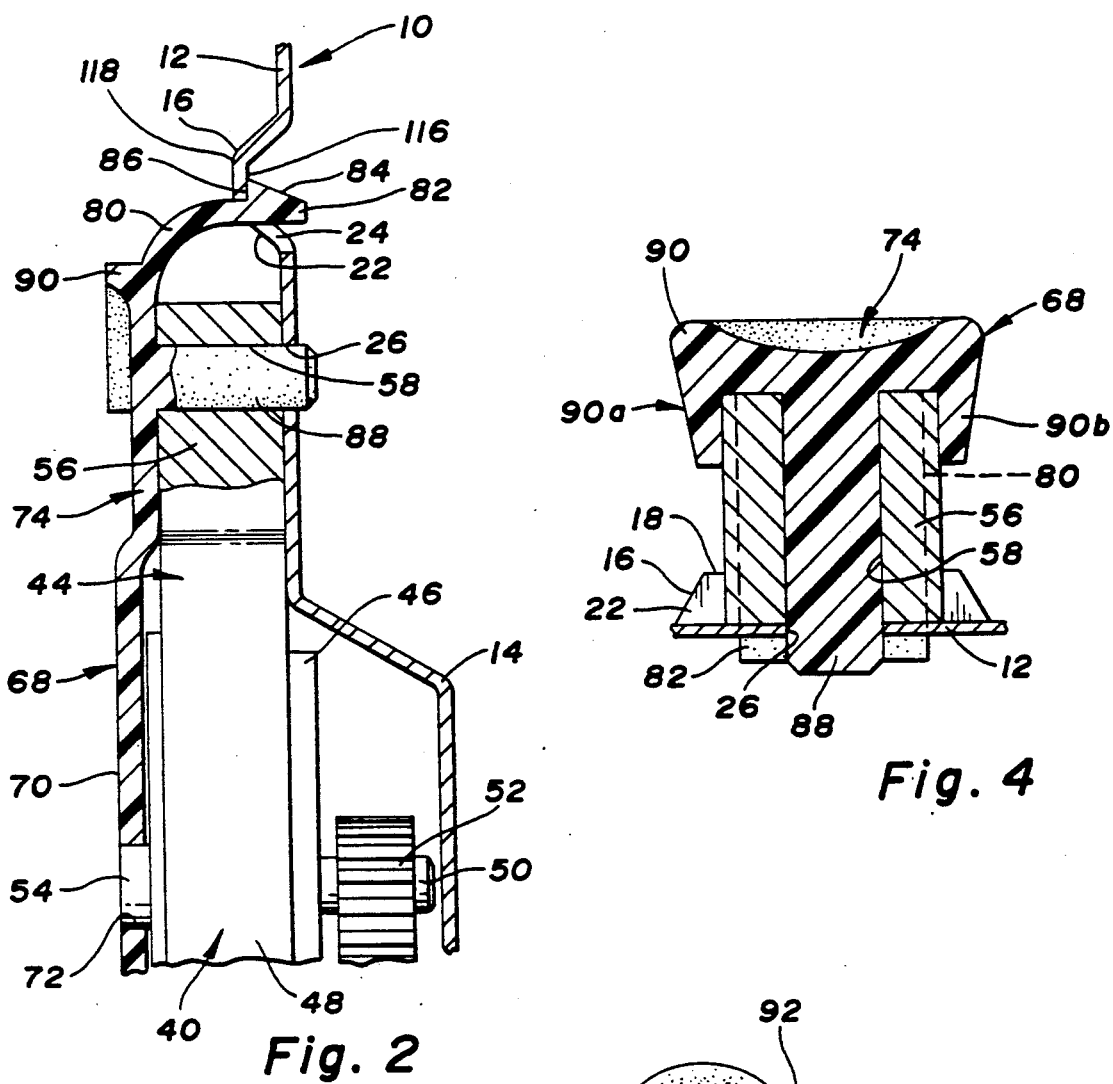
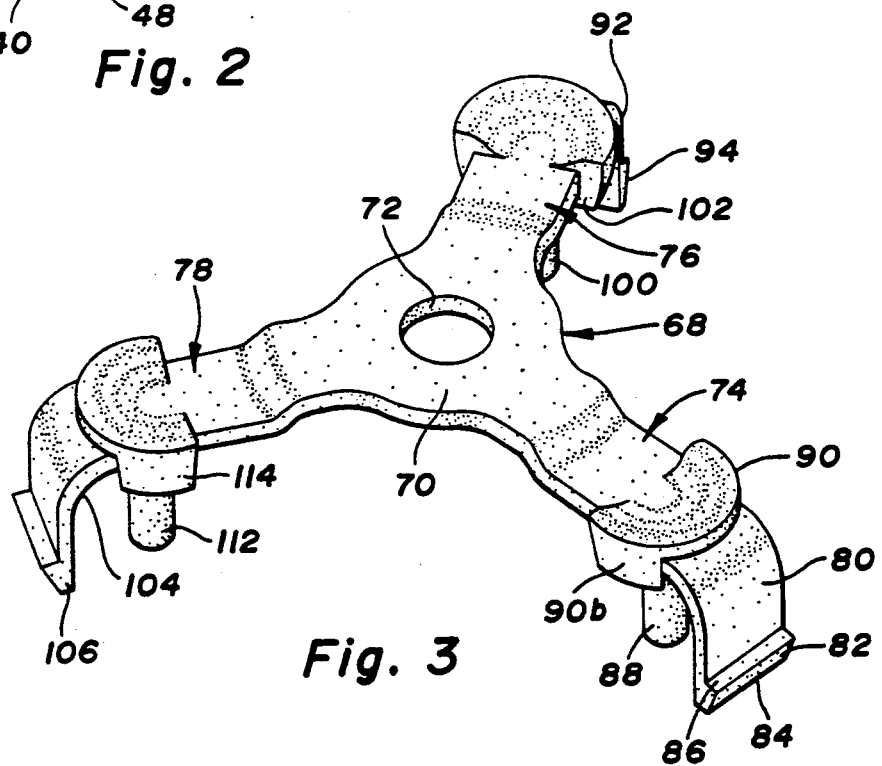

POWER WINDOW MOTOR MOUNTING BRACKET

This invention relates to an assembly for mounting a power window motor to a door panel of a vehicle and more particularly to a bracket that engages the door panel to secure the power window motor.

BACKGROUND OF THE INVENTION

It is known to have the windows in a motor vehicle driven up and down by a power window regulator motor. The power window regulator motor has to be secured to the door panel. It is known to have a plurality of holes located in a housing of the power window regulator which align with holes in an inner door panel. A set of screws or rivets is received by the holes in the housing and the door panel to secure and prevent rotation of the power window regulator motor relative to the door panel.

It would be desirable to have a one piece bracket for attaching the power window regulator motor to the door panel which uses the existing power window regulator motor and snaps into place eliminating the need for multiple fasteners such as screws or rivets.

SUMMARY OF THE INVENTION

This invention provides a mounting bracket for mounting a window regulator motor housing with three holes to a door panel having three holes aligned with the holes in the power regulator motor and three slots. The mounting bracket has three legs projecting radially outward from a central portion. Each leg has an arm that depends toward the door panel carrying a tab with a ramp surface for engaging the door panel for flexing the tab as tab is inserted through the slot of the door panel. Each tab has a shoulder for engaging the door panel upon the tab flexing back after insertion of the tab into the slot so that the bracket is secured to the door panel. The central portion engages the motor housing for sandwiching the motor housing between the mounting bracket and the door panel so that the motor housing is mounted to the door panel. Three locator pins depending through the holes in the motor housing and the aligned holes in the door panel prevent rotation of the motor housing in relation to the door panel. The legs of the mounting bracket are equally spaced radially about the central portion.

One object, feature and advantage resides in the provision of a mounting bracket having a plurality of legs projecting radially outward from a central portion, each leg having an arm depending toward the door panel and carrying a tab with a ramp surface for engaging the door panel for flexing the tab as the tab is inserted in a normal direction to the panel through the slot of the door panel, the tab having a shoulder for engaging the door panel upon the tab flexing back after insertion so that the bracket is secured to the door panel, the central portion adapted for engaging the motor housing for sandwiching the motor housing between the mounting bracket and the door panel so that the motor housing is mounted to the door panel.

Another object, feature and advantage resides in the provision of the bracket having a plurality of locator pins that are received by a plurality of holes in a window regulator motor housing for preventing rotation of the window regulator motor housing in relation to a door panel.

Further objects, features and advantages of the present invention will become more apparent to those skilled in the art as the nature of the invention is better understood from the accompanying drawings and detailed description.

BRIEF DESCRIPTION OF THE DRAWINGS

FIG. 2 is a sectional view taken in the direction of arrows 2—2 in FIG. 1.

FIG. 3 is a perspective view of the the bracket.

FIG. 4 is a sectional view taken in the direction of arrows 4—4 in FIG. 1.

DESCRIPTION OF THE PREFERRED EMBODIMENT

Figure 1:
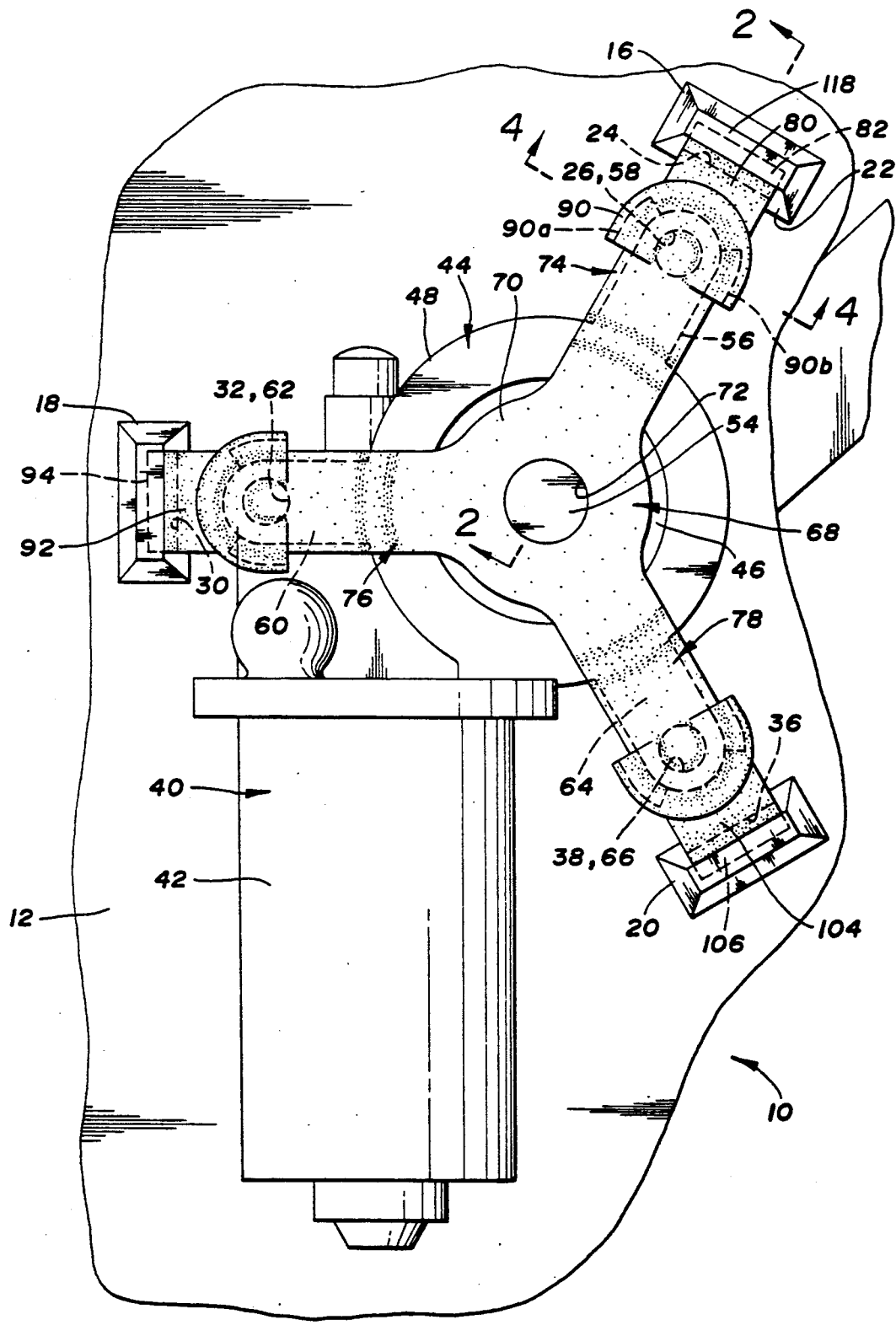
FIG. 1 is an elevation view of the bracket securing the power regulator motor to the door panel.

Referring to FIGS. 1 and 2, a motor vehicle 10 has a inner door panel 12 of stamped metal formed with a recess area 14. A triplet of protuberances 16, 18 and 20 are radially spaced 120° apart about the recess area 14 on the door panel 12. Referring to FIG. 2, the protuberance 16 has the shape of a frustum of a pyramid with a surface 22 which faces the recess area 14 having a slot 24. The other protuberances 18 and 20 likewise are the same shape and each have a slot 30 and 36. A triplet of holes 26, 32 and 38 are radially spaced on the door panel 12 about the recess area 14 with the hole 26 positioned between the protuberance 16 and the recess area 14. The other holes 32 and 38 are similarly positioned.

A power regulator motor 40 has a motor portion 42 and a gear box portion 44. Referring to FIG. 2, the gear box portion 44 has a central section 46 where a shaft 50 with a gear 52 projects out of one side of a housing 48. The other side of the housing 48 has a protrusion 54 for encasing the other end of the shaft 50. Referring to FIG. 1, the gear box portion 44 has a triplet of legs 56, 60 and 64 that are radially spaced around the central section 46. Referring to FIG. 2, the leg 56 has a hole 58 which aligns with the hole 26 in the door panel 12 when the power regulator motor 40 is positioned against the door panel 12. The other legs 60 and 64 each have a hole 62 and 66 which aligns with other holes 32 and 38 in the door panel 12 as shown in hidden lines in FIG. 1.

Referring to FIG. 3, a mounting bracket 68 has a plurality of legs 74, 76 and 78 projecting radially outward from a central portion 70 and radially spaced at 120°. Referring to FIG. 2, the leg 74 has an arm 80 that depends downward ending in a tab 82 with a ramp surface 84 for facilitating entry into the slot 24 on the door panel 12. A shoulder 86 is located at the top of the ramp surface 84 of the tab 82 for engaging the door panel 12 when the tab 82 is inserted in the slot 24 on an underside 116 of a top surface 118 of the protuberance 16. The other two legs 76 and 78 also have arms 92 and 104 with tabs 94 and 106 as seen in FIG. 3. Referring to FIGS. 2 and 4, the leg 74 of the mounting bracket has a molded pin 88 which aligns with and is received by the hole 58 in the gear box portion 44 of the power regulator motor 40 and the hole 26 in the door panel 12, when the mounting bracket 68 and power regulator motor 40 are mounted to the door panel 12. Referring to FIGS. 4 and 2, the leg 74 of the mounting bracket 68 has a collar 90 with two fingers 90a and 90b which cradle the leg 56 of the gear box portion 44 of the power regulator motor 40. The other legs 76 and 78 each have a molded pin 100 and 112 and a collar 102 and 114 also as seen in FIG. 3. A hole 72 is located in the central portion 70 of the mounting bracket 68 for clearance for the protrusion 54 of the housing 48 of the power regulator motor 40.

To install the power regulator motor 40 to the door panel 12, the mounting bracket 68 is placed on the power regulator motor 40 with the molded pins 88, 100 and 112 aligned and received by the holes 58, 62 and 66 in the legs 56, 60 and 64 of the power regulator motor 40. The hole 72 in the central portion 70 of the mounting bracket 68 receives the protrusion 54 in the housing 48 of the power regulator motor 40. Since the mounting bracket 68 is symmetric, the bracket 68 need only rotated a maximum of 60° to align with the power regulator motor 40.

The assembly of the power regulator motor 40 and mounting bracket 68 is positioned on the door panel 12 with the gear 52 and shaft 50 aligned with recess area 14 in the door panel 12. The gear 52 engages a regulator assembly, not shown, to drive a window up and down. The tabs 82, 94 and 106 on the legs 74, 76 and 78 of the mounting bracket 68 are aligned with the slots 24, 30 and 36 in the protuberances 16, 18 and 20 on the door panel 12, resulting in the molded pins 88, 100 and 112 aligning with the holes 26, 32 and 38 in the door panel 12. Referring to FIG. 2, the mounting bracket 68 is pushed in a normal direction towards the door panel 12, with the ramp surface 84 of the tab 82 engaging the slot 24 flexing the arm 80 of the mounting bracket 68 towards the central portion 70. When the ramp surface 84 has completely passed through the slot 24, the arm 84 flexes back with the shoulder 86 of the tab 82 engaging the door panel 14. Simultaneously the molded pin 88 is received by the hole 26 in the door panel 12. The other tabs 94 and 106 engage the other slots 30 and 36 and the other molded pins 100 and 112 are received by the other holes 32 and 38 at the same time. The power regulator motor 40 is secured to the door panel 12.

To remove the power regulator motor 40 from the door panel 12, the arm 80 of the mounting bracket 68 is flexed toward the central portion 70 disengaging the shoulder 86 of the tab 82 from the door panel 12. The other arms 92 and 104 are similarly flexed to disengage the other tabs 94 and 106 from the door panel 12. The power regulator motor 40 and mounting bracket 68 are then pulled away in a normal direction from the door panel 12.

While an embodiment of the present invention has been explained, various modifications within the spirit and scope of the following claims will be readily apparent to those skilled in the art.

For example, the mounting bracket could be formed as an integral portion of the housing of the gear box portion.

The embodiments of the invention in which an exclusive property or privilege is claimed are defined as follows:

1. In a motor vehicle door having a window regulator motor for mounting to a door panel having a plurality of openings, the improvement comprising:
   retaining means having a plurality of arm that depends towards the door panel ending in a tab adapted for flexively entering the openings in the panel in a normal direction to the panel and securing with the door panel for securing the window regulator motor, and the retaining means having an anti-rotation means for preventing rotation of the window regulator motor in relation to the door panel whereby the window regulator motor is secured to and prevented from rotation in relation to the door panel.

2. In a motor vehicle door having a window regulator motor for mounting to a door panel, the improvement comprising:
   the door panel having a plurality of slots; and a bracket having a plurality of legs projecting radially outward from a central portion, each leg having an arm depending toward the door panel and carrying a depending tab with a ramp surface for engaging the door panel for flexing the tab as the tab is inserted in a normal direction to the panel through the slot of the door panel, the tab having a shoulder for engaging the door panel upon the tab flexing back after insertion so that the bracket is secured to the door panel, the central portion adapted for engaging the motor housing for sandwiching the motor housing between the bracket and the door panel so that the motor housing is mounted to the door panel, and the bracket having an anti-rotation means for engaging the motor housing to prevent rotation of the motor housing in relation to the bracket and the door panel whereby the motor housing is secured to and prevented from rotating in relation to the door panel.

3. In a motor vehicle door having a window regulator motor housing having a plurality of holes and a door panel having a plurality of holes aligned with the holes in the motor housing, regulator motor, the improvement comprising:
   the door panel having a plurality of slots; and
   a mounting bracket having a plurality of legs projecting radially outward from a central portion, each leg having an arm depending toward the door panel ending in a tab having a ramp surface for engaging the door panel for flexing the tab as the tab is inserted in a normal direction to the panel through the slot of the door panel, the tab having a shoulder for engaging the door panel upon the tab flexing back after insertion so that the bracket is secured to the door panel, the central portion adapted for engaging the motor housing for sandwiching the motor housing between the mounting bracket and the door panel so that the motor housing is mounted to the door panel, and the mounting bracket having a plurality of locator pins depending through the holes in the motor housing and the aligned holes in the door panel to prevent rotation of the motor housing in relation to the door panel.

4. The mounting bracket in claim 3 wherein the legs are equally spaced radially about the central portion.

* * * * *